Feb. 13, 1923.
A. MOYNA
GOPHER TRAP
Filed Apr. 23, 1921
1,445,602
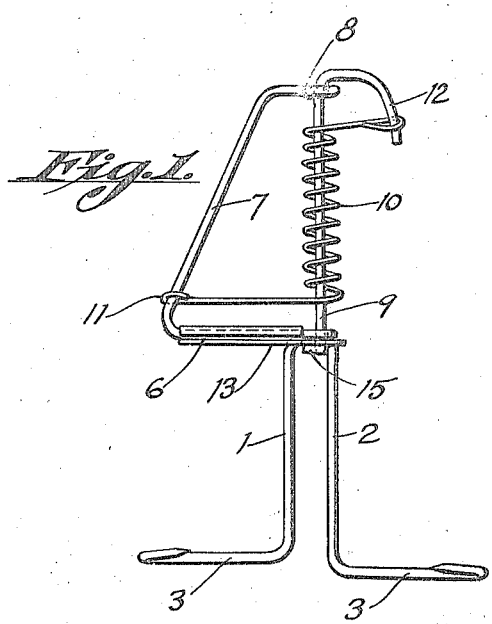
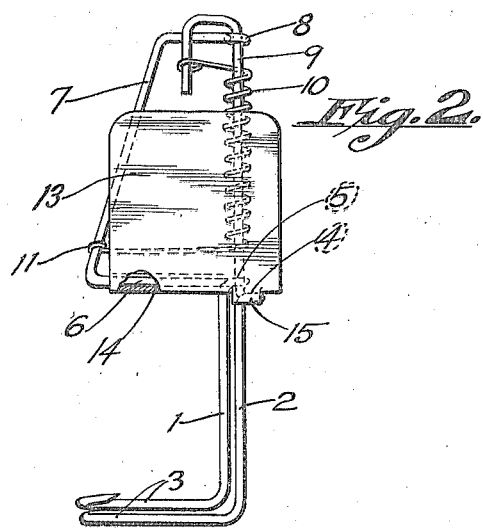
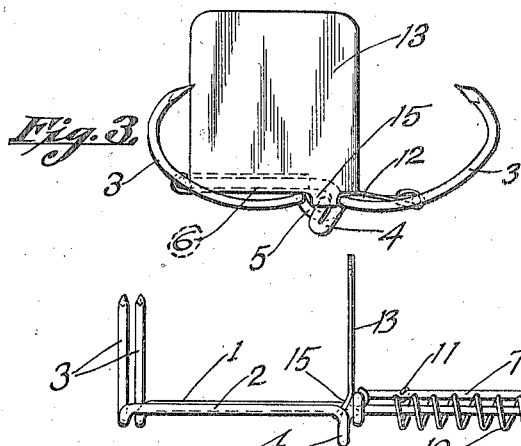
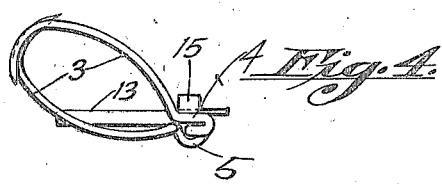
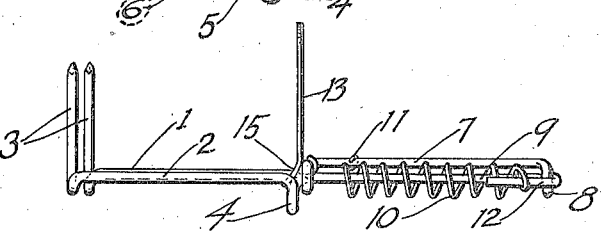

Patented Feb. 13, 1923.

1,445,602

UNITED STATES PATENT OFFICE.

ARTHUR MOYNA, OF EAST SAN GABRIEL, CALIFORNIA.

GOPHER TRAP.

Application filed April 23, 1921. Serial No. 463,899.

*To all whom it may concern:*

Be it known that I, ARTHUR MOYNA, a citizen of the United States, residing at East San Gabriel, in the county of Los Angeles and State of California, have invented new and useful Improvements in Gopher Traps, of which the following is a specification.

This invention relates to traps particularly useful for catching gophers and the like, and has for its object the provision of a trap structure which may be inexpensively manufactured and which will be positive and efficient in its action.

The trap includes members having laterally extending and co-operating prongs, said members being arranged to be rotated toward one another so as to cause the formation of a closed loop by said prongs and around the animal to be caught. The members, as thus described, are normally held in said position with the prongs swung apart, and a trigger mechanism in operative position to be impinged by an animal so as to release the same and thereby permit said swinging of the prong members toward one another under the influence of a suitable spring.

The invention will be readily understood from the following description of the accompanying drawings, in which—

Figure 1 is a plan view of a trap constructed in accordance with the invention, and in set position.

Fig. 2 is a similar view showing the trap after actuation thereof and in position engaging an animal.

Figs. 3 and 4 are front elevations of the trap in set and in actuated positions respectively.

Fig. 5 is a side elevation of the trap in set position.

The trap preferably includes wire rods 1 and 2 arranged alongside of one another, and at their forward ends having laterally extending prong members which are curved, as clearly shown in Figs. 3 and 4, so that when the rods are rotated away from one another, the prongs will be swung apart, as shown in Fig. 3, to form a space between the same for the passage of an animal, and when the rods are swung toward one another as shown in Fig. 4. they will squeeze the body of the animal caught between the same.

One of the rods, shown as rod 2, is provided with a laterally offset loop 4 forming an abutment element, and the rod 1 is provided with a pivoted loop 5 received around rod 2 in the rear of the loop 4 and continuing as a lateral extension 6. The lateral extension 6 is then bent rearwardly, as shown at 7, and terminates in a loop 8 received around the longitudinal continuation 9 of rod 2. By this arrangement it will be seen that rods 1 and 2 are arranged for relative rotation toward and away from one another.

The rods are normally yieldably urged toward one another so as to form the engaging loop of prongs 3, and for this purpose a spring 10 is coiled around the extension 9 of rod 2 with one end thereof looped over the rearward extension 7 as shown at 11, and its other end looped over a lateral offset 12 formed at the rear end of extension 9.

When the rods 1 and 2 are swung apart they are spaced transversely in a horizontal plane, as clearly shown in Fig. 1, and an abutment member having a trigger element is pivotally mounted upon the lateral extension 6 so that the trigger may engage between rods 1 and 2 when the abutment element is swung upwardly and in order to hold the rods against relative rotation.

For this purpose the abutment member is shown as a plate 13 looped over extension 6 at its lower edge as shown at 14 and having the curved tongue 15 extending from the lower edge of the plate 13 so as to form the trigger member adapted to be received between rods 1 and 2. It will be noted that when the plate 13 is swung upwardly that the trigger member will engage between rods 1 and 2 to retain the trap in set position, and that when an animal, moving through the passageway defined by the spread prongs 3, abuts against the plate 13, the latter will be swung downwardly so as to move the trigger member out of engagement with rods 1 and 2. As a consequence, the rods will be rotated toward one another through spring 10 and the prongs will then co-operate to form the loop for engaging the animal, as previously described.

Various changes may be made without departing from the spirit of the invention as claimed.

What is claimed is:

1. A trap comprising pronged rods alongside of one another and having one of said rods looped around the other to form a pivotal connection a spring tending to rotate said rods toward one another to cause co-operation of said prongs, one of said rods having a lateral offset at the ends of which said loops are formed, and a trigger element pivoted on a radial arm of said offset and adapted to be swung into engaging position between the rods when the latter are rotated away from one another into set position, said trigger being also adapted to be releasably swung in the opposite direction when impinged so as to permit said rotary movement of said rods.

2. A trap comprising pronged rods alongside of one another and having a spring connection tending to rotate said rods toward one another to cause co-operation of said prongs, and an abutment element having a trigger extension and adapted to be swung into position with said trigger extension between the rods when the latter are rotated away from one another into set position, said abutment element being also adapted to be swung so as to release said trigger when impinged and thereby permit said rotary movement of said rods.

3. A trap comprising rods having laterally extending co-operating prongs, said rods being positioned alongside of one another and having a spring connection tending to rotate said rods toward one another to cause co-operation of said prongs, and a trigger element adapted to be swung into position between the rods and abutting against the same when the latter are rotated away from one another into set position, said trigger being also adapted to be released when impinged so as to permit said rotary movement of said rods.

4. A trap comprising pronged rods alongside of one another and having one of said rods looped around the other to form a pivotal connection, said rods also having lateral offsets with a spring coiled around one of said rods and connected at its ends to the respective lateral offsets so as to tend to rotate said rods toward one another to cause co-operation of said prongs, one of said offsets consisting of a substantially radial arm having at its inner end a bearing loop and a trigger element adapted to be swung on said radial arm into engaging position between the rods when the latter are rotated away from one another into set position, said trigger being also adapted to be released when impinged so as to permit said rotary movement of said rods.

In testimony whereof I have signed my name to this specification.

ARTHUR MOYNA.